United States Patent
Tian et al.

(10) Patent No.: US 8,287,147 B2
(45) Date of Patent: Oct. 16, 2012

(54) LED BASED OMNI-DIRECTIONAL LIGHT ENGINE

(76) Inventors: Rongsheng Tian, Santa Clara, CA (US); Yong Tian, Santa Clara, CA (US)

(*) Notice: Subject to any disclaimer, the term of this patent is extended or adjusted under 35 U.S.C. 154(b) by 505 days.

(21) Appl. No.: 12/462,259

(22) Filed: Jul. 31, 2009

(65) Prior Publication Data

US 2010/0123397 A1  May 20, 2010

Related U.S. Application Data

(60) Provisional application No. 61/199,252, filed on Nov. 15, 2008.

(51) Int. Cl.
*F21V 5/00* (2006.01)
*G05F 1/00* (2006.01)
*H05B 37/02* (2006.01)
*H05B 39/04* (2006.01)
*H05B 41/36* (2006.01)
*H05B 37/00* (2006.01)
*H05B 39/00* (2006.01)
*H05B 41/00* (2006.01)

(52) U.S. Cl. .................. 362/244; 315/291; 315/312
(58) Field of Classification Search .................. None
See application file for complete search history.

(56) References Cited

U.S. PATENT DOCUMENTS

| | | | |
|---|---|---|---|
| 5,594,433 A | 1/1997 | Terlep | |
| 6,086,220 A | 7/2000 | Lash et al. | |
| 6,533,446 B2 | 3/2003 | Chen et al. | |
| 6,568,834 B1 | 5/2003 | Scianna | |
| 7,021,801 B2 | 4/2006 | Mohacsi | |
| 7,261,454 B2 | 8/2007 | Ng | |
| 7,378,983 B2 | 5/2008 | Wang et al. | |
| 7,445,354 B2 * | 11/2008 | Aoki et al. | 362/241 |
| 7,635,957 B2 * | 12/2009 | Tripathi et al. | 315/309 |
| 2005/0068777 A1 * | 3/2005 | Popovic | 362/307 |
| 2005/0162845 A1 * | 7/2005 | McDermott | 362/35 |
| 2007/0278512 A1 * | 12/2007 | Loh et al. | 257/99 |
| 2008/0130272 A1 * | 6/2008 | Waters | 362/106 |

* cited by examiner

*Primary Examiner* — Douglas W Owens
*Assistant Examiner* — Dedei K Hammond
(74) *Attorney, Agent, or Firm* — Dahyee Law Group; Leon E. Jew (57) ABSTRACT

An LED based omni-directional light engine includes a toroidal lens coupled to a controller circuit board and two or more evenly spaced LEDs mounted to the controller circuit board. The toroidal lens includes an inner surface coated with a layer of reflection materials, an outer surface, and a flat base surface. The controller circuit board is electrically coupled to a power source. The LEDs are located immediately under the flat base surface. The inner surface substantially reflects light beams emitted from the LEDs to the outer surface which refracts the beams to the omni-directions.

20 Claims, 5 Drawing Sheets

LED BASED OMNI-DIRECTIONAL LIGHT ENGINE

REFERENCE TO RELATED APPLICATIONS

The present application claims priority to the provisional Appl. Ser. No. 61/199,252 filed on Nov. 15, 2008, the entire content of which is hereby incorporated by reference.

FIELD OF THE INVENTION

The present invention relates generally to LED based lighting technology. In particular, the invention relates to a unique LED based omni-directional light engine using one or more toroidal lenses.

BACKGROUND OF THE INVENTION

Traditionally, the incandescent is used as a light source for an omni-directional light. The major disadvantages of that type of light are low efficiency and short life span. Since 1990s, LEDs have been used as light source in many applications. The common incandescent lamp provides an illumination pattern in all directions. It is this standard that must be met if LEDs are to replace it in the applications. Early LEDs were limited to about a 30-degree viewing angle. Today, it is common for LEDs to provide a 120-degree illumination pattern but the intensity is still reduced to 50% at the extremes of the pattern.

There are various ways to extend the illumination pattern of LEDs. One of the common methods is diffusion, using a diffraction-style lens or canopy. The disadvantage of these methods is that they may attenuate the total light output and fail to provide an even intensity light pattern in all directions. Another method is to mount many LEDs, pointing in all directions, in a framework similar to a pine cone. This approach is costly and difficult to manufacture. It also provides bright spots where the LEDs are located.

Various LED based omni-directional lights have been developed. In U.S. Pat. No. 5,594,433, Terlep disclosed an omni-directional LED lamp in three embodiments. In the first embodiment, two LEDs are mounted side by side in a miniature bayonet base that can fit into a conventional miniature bayonet socket. The side-by-side LEDs face semi-spherical mirror reflectors that distribute the unidirectional light emitted from the LEDs over an omni-direction. A second embodiment has two LEDs facing one another with a spherical mirror reflector between to cause unidirectional light to be omni-directional. In a third embodiment, a semi-spherical reflector is mounted in the top of a lens cover above an LED. The components are housed in a sealable casing for marine applications where the casing can be mounted to a dock piling.

In U.S. Pat. No. 6,086,220, Lash, et al, disclosed a marine safety light including a LED array which consists of a plurality of LEDs arranged in a star configuration. The LED array preferably consists of six white LEDs evenly spaced in the horizontal plane and positioned within a fresnel lens such that an even omni-directional distribution of light is emitted. The LED array is powered using a power circuit which includes two conventional DC to DC converters which regulate the output voltage, allowing the marine light to operate at a constant brightness for a substantial period of time on a conventional 1.5 volt power source.

In U.S. Pat. No. 6,533,446, Chen, et al, disclosed a light using LED as light source. A light guide receives and guides light output from the light source. The light guide extends out from the light source. A reflector is positioned in the light guide and reflects the light guided through the light guide to provide the appropriate illumination.

In U.S. Pat. No. 6,568,834, Scianna disclosed a light modifying material composed of ethylene/butene-1 copolymer or propylene homopolymer or a combination of the two, and lighting devices using the material in a light transmitting cover. The light source for the devices is a semiconductor or LED, to produce an energy efficient light source.

In U.S. Pat. No. 7,021,801, Mohacsi disclosed a high-intensity light comprising a side-emitting optoelectronic device adapted to emit light of a desired color. A heat sink is positioned adjacent the optoelectronic device and a reflector at least partially surrounds the optoelectronic device. The reflector is spaced a distance from the optoelectronic device. A window portion is sized to output the light in a desired arc.

In U.S. Pat. No. 7,261,454, K. Y. Ng disclosed an omni-directional LED device. In one embodiment, an opaque barrier is created and in some embodiments enhancement surfaces are created below the opaque barrier to increase lumen output from the device sides. In one embodiment, a reflecting structure is created to assist with horizontal light mixing. The horizontally mixed light is then redirected through a structure, such as an LED structure, to create a high lumen output, slender back-lighted display.

In U.S. Pat. No. 7,378,983, Wang, et al, disclosed a LED signaling apparatus for navigational aids. The signaling apparatus comprises a plurality of high intensity LEDs with their output beams individually controlled by high precision optical beam transformers. The transformed LED beams are mixed in a predetermined manner by controlling the relative position, angular orientation, and other parameters of the LEDs to produce a desired illumination pattern.

However, all these systems or apparatuses suffer from complex structure, leading to low reliability, difficulty in assembly, high light transmission loss, and low operational efficiency.

What is desired is an improved omni-directional light system which offers a combination of simple structure, long life time, low cost, high luminous power, compact size, and high reliability.

SUMMARY OF THE INVENTION

This invention discloses a new type of LED light source powered omni-directional light engine which may be used for aviation, maritime navigation and obstacle marking. The omni-directional light engine includes a toroidal reflective-refractive lens coupled to a framework where the LEDs are mounted and the electronic circuits for powering the LEDs are embedded. The toroidal reflective-refractive lens has three optical surfaces, including one inner reflective surface, one bottom refractive surface, and an outer refractive surface. The toroidal reflective-refractive lens covers the LEDs which are evenly spaced along a circumference of the framework. The light passes from the LEDs, through optical impedance matching gel, then outputs from the outer surface of the toroidal reflective-refractive lens.

In the first preferred embodiment, the LED based omni-directional light engine includes a toroidal lens coupled to a controller circuit board to which at least two LEDs are mounted. The toroidal lens includes an inner surface coated with a layer of reflection materials, an outer refractive surface, and a flat base refractive surface. The controller circuit board is electrically coupled to a power source. The distances between any two adjacent LEDs are identical. When the toroidal lens is coupled to the controller circuit board, the LEDs are located immediately under the flat base surface.

The inner reflective surface substantially reflects the light beams emitted from the LEDs to the outer surface which refracts the beams to the omni-directions. The LEDs can be in different colors following any pattern according to the usage of the light engine. The controller circuit board can be configured in such a manner that the positions of the LEDs are adjustable.

In the second preferred embodiment, the LED based omni-directional light engine includes a number of modular units which are mechanically and electrically coupled together. Each modular unit includes a toroidal lens coupled to a controller circuit board to which at least two LEDs are mounted. The toroidal lens includes an inner surface coated with a layer of reflection materials, an outer refractive surface, and a flat base refractive surface. The controller circuit board is electrically coupled to a power source. The distances between any two adjacent LEDs in the same unit are identical. When the toroidal lens is coupled to the controller circuit board, the LEDs are located immediately under the flat base surface. The inner surface substantially reflects the light beams emitted from the LEDs to the outer surface which refracts the beams to the omni-directions. The LEDs can be in different colors following any pattern according to the usage of the light engine. The controller circuit board can be configured in such a manner that the positions of the LEDs are adjustable. The toroidal lens can be compartmentalized into two or more segments which are mechanically coupled together. Each compartmentalized segment can be modularly replaced and can be separately used.

In the third preferred embodiment, the toroidal lens is compartmentalized into two or more segments which are mechanically coupled together. The two ends of each segment are coated with reflective material. Depending on the desired application, the length of each toroidal lens segment may vary and the LEDs of different color and size may be placed under each segment. For example, it can be a bi-directional engine with two colors in the opposite sides, each taking up 180 degrees. Two sets of LEDs are placed under each segment. Each compartmentalized segment can be modularly replaced and can be separately used.

The light engine according to this invention offers high performance through low optical loss and high transmission efficiency. Due to its simple structure, the assembly cost is comparative low. In addition, the apparatus is suitable for varied operational environment and reduced maintenance cost.

DETAILED DESCRIPTION OF THE INVENTION

While the present invention may be embodied in many different forms, designs or configurations, for the purpose of promoting an understanding of the principles of the invention, reference will be made to the embodiments illustrated in the drawings and specific language will be used to describe the same. It will nevertheless be understood that no limitation or restriction of the scope of the invention is thereby intended. Any alterations and further implementations of the principles of the invention as described herein are contemplated as would normally occur to one skilled in the art to which the invention relates.

Figure 1:
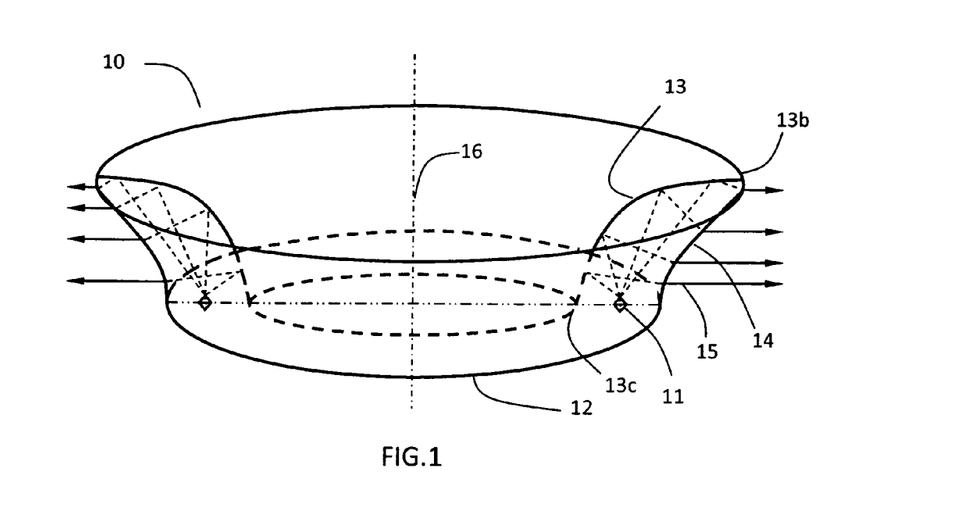
FIG. 1 is a schematic perspective diagram illustrating a simplified shape of the toroidal lens according to the present invention.
Figure 2:
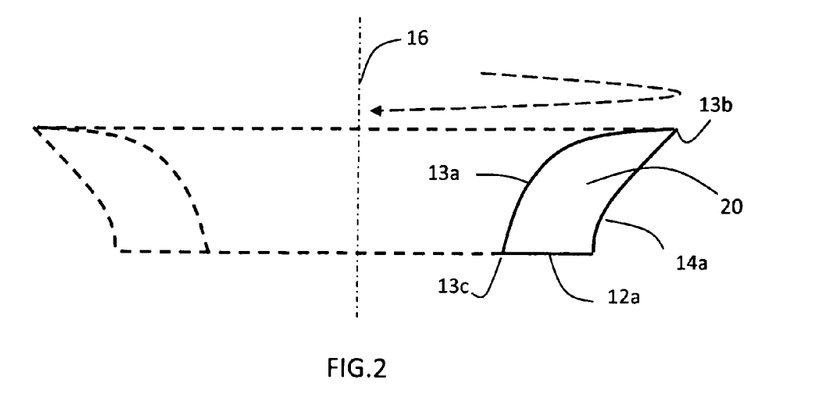
FIG. 2 is a schematic diagram illustrating that the shape of the toroidal lens of FIG. 1 is made by revolving a two dimensional closed curve about an axis.
Figure 5:
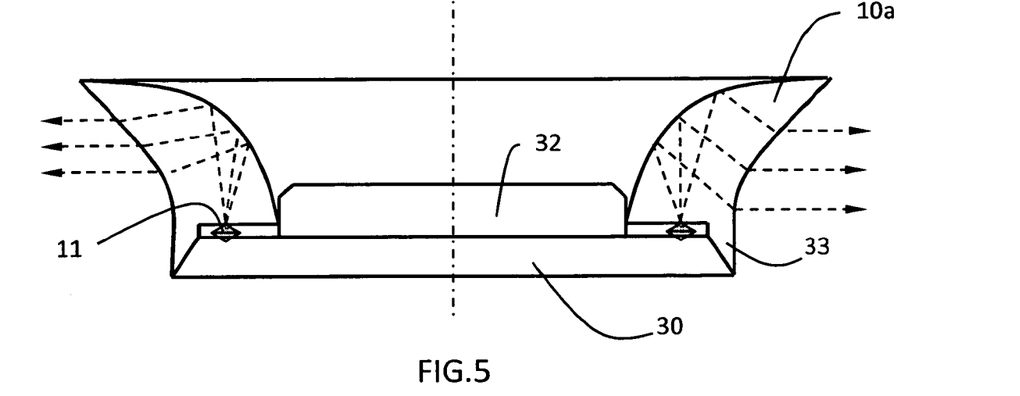
FIG. 5 is a schematic front sectional view of a single tier omni-directional light according to the first preferred embodiment of the invention.

FIG. 1 is a schematic perspective diagram illustrating a simplified shape of the toroidal lens according to this invention. The toroidal lens 10 is made of transparent materials such as glass or acrylic, having an annular flat base surface 12 at its bottom, an inner annular curved surface 13 and an outer annular curved surface 14. The inner annular surface 13 means the annular surface facing the axis 16. The outer annular surface 14 means the annular surface facing outwardly. The body shape of the toroidal lens 10 is a surface of revolution generated by revolving an irregular two-dimensional closed curve 20 as shown in FIG. 2 in a three-dimensional space about an axis, such as the axis 16, coplanar with and not touching the closed curve. In other words, the closed curve 20 of FIG. 2 is a right cross-sectional view of the toroidal lens 10 of FIG. 1. In the simplified format, the closed curve 20 includes a straight line 12a, an inner curved line 13a and an outer curved line 14a. The annular flat base surface 12 is made by revolving the straight line 12a around the axis 16. The inner annular curved surface 13 is made by revolving the curved line 13a around the axis 16. The outer annular curved surface 14 is made by revolving the curved line 14a around the axis 16. The curvatures of the inner curved line 13a and the outer curved line 14a are different. As such, the inner annular curved surface 13 and the outer annular curved surface 14 have different curvatures. As shown in FIG. 1 and FIG. 2, the inner surface's upper edge 13b is merged with the outer surface 14 and the inner surface's lower edge 13c is merged with the flat base surface 12. In particular, the inner surface 13, the plane where the inner surface's upper edge 13b resides and the plane where the inner surface's lower edge 13c resides, defines a central hollow space around the axis 16. This central hollow space, in the following paragraphs describing FIG. 5, is also referred to as the toroidal lens' central hole. The toroidal lens can be in a three-dimensional polygon shape. Specifically, the three-dimensional polygon shape can be made by revolving an irregular two-dimensional closed curve along an enclosed polygon path.

There are at least two LEDs which are placed under the annular bottom surface 12 and are evenly spaced around a circumference corresponding to the annular bottom surface. The light beams, such as the beam 15 in FIG. 1, emitted from the LEDs such as the LED 11, travel to the inner side of the inner surface 13 and are reflected by the inner surface 13. The reflected light beams from the inner surface 13 further travel to the outer surface 14 where the light beams are refracted and projected outwardly.

The curvatures of the inner reflective surface and the outer surface may vary and their design are determined by the factors such as (1) the directional requirements of the light beams projected from the toroidal lens; (2) the refractive index of the materials for the lens; and (3) the LEDs' positions relative to the lens.

In a typical configuration, the inner reflective surface 13 in FIG. 1 can be a surface formed by the revolving a segment of a spherical or aspheric profile, such as parabola, oval, sagged parabola, or sagged oval. In other words, the inner curved line 13a in FIG. 2 can be a segment of spherical or aspheric profile, such as parabola, oval, sagged parabola, or sagged oval. The inner reflective surface is made by coating a layer of reflection materials on the lens' inner surface.

Similarly, in a typical configuration, the outer refractive surface 14 in FIG. 1 can be a surface formed by the rotation of a segment of line or a segment of spherical or aspheric profile, such as circle, oval, sagged circle, sagged oval, etc. In other words, the inner curved line 14a in FIG. 2 can be a segment of line or a segment of spherical or aspheric profile, such as circle, oval, sagged circle, sagged oval, etc.

Figure 3:
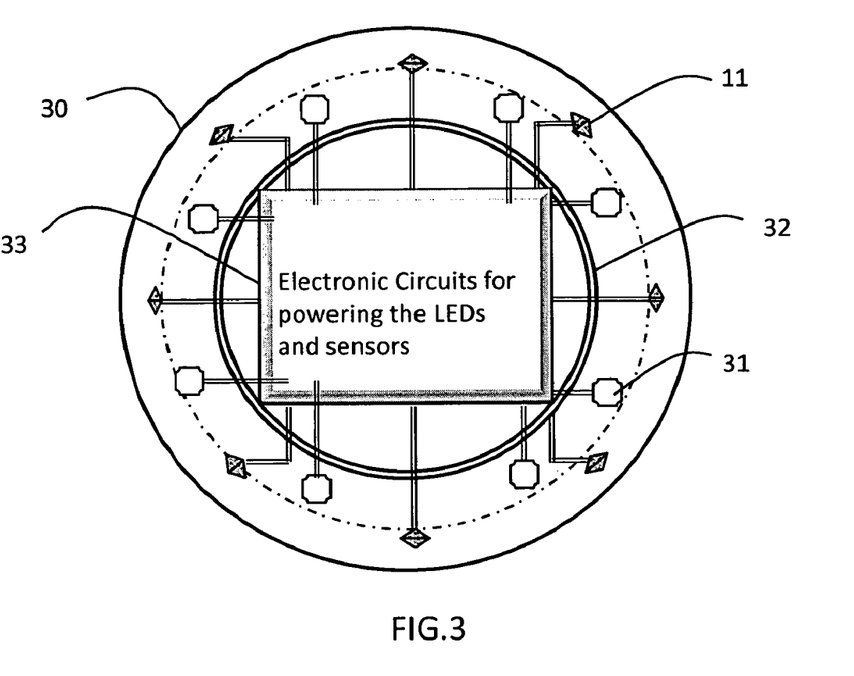
FIG. 3 is a schematic top view of an exemplary controller circuit board according to the first preferred embodiment of the invention.

In a typical configuration, the LEDs are mounted to a base board, which is called controller circuit board in this application. The controller circuit board supports the LEDs, heat sinks and the electronic circuits that power and controls the LEDs. FIG. 3 is a schematic top view of an exemplary controller circuit board 30. There are eight LEDs, such as 11, which are evenly spaced and placed in a circumference corresponding to the flat base surface 12 in FIG. 1. The shape and size of the LEDs in FIG. 3 are for illustration only. The number of the LEDs can be any. However, for the purpose of the omni-directions, at least two LEDs are required.

Optionally, various sensors 31, such as thermo sensors, light sensors and voltage sensors, can be incorporated in the controller circuit board 30. The thermo sensor is used to measure the temperature of the LEDs. The LEDs' efficiency is heavily influenced by temperature. The controller circuit uses the thermo sensor measurement to compensate by controlling current to achieve consistent light intensity. The light sensor is used to measure ambient light. The control circuit uses the ambient light measurement to turn on and off the LEDs or change the output intensity, such as turning off LEDs during day time, or increasing the light intensity to compensate for bright background. The sensors and control circuit ensures the omni-directional light's stable working state over a long time period.

Figure 4:
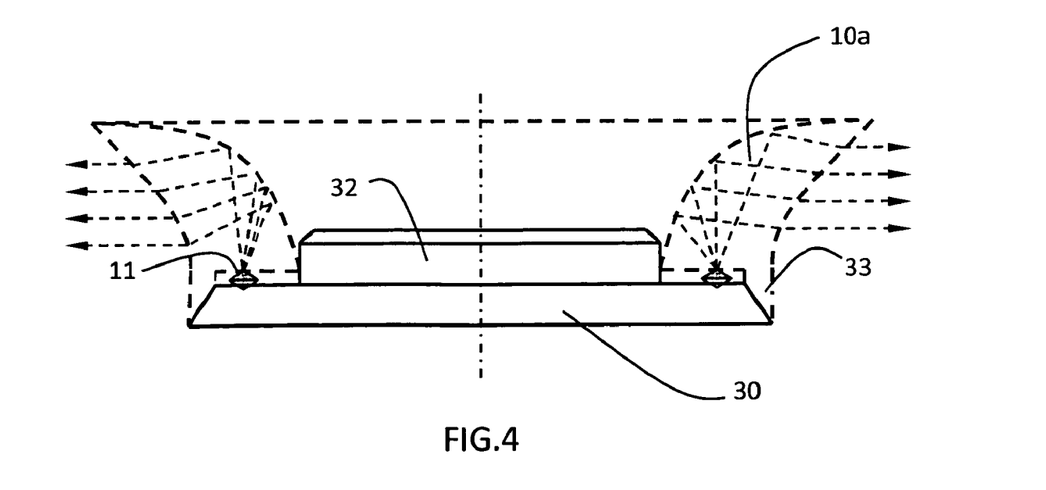
FIG. 4 is a schematic front view of the controller circuit board of FIG. 3.

FIG. 4 is a schematic front sectional view of the controller circuit board 30 of FIG. 3. The controller circuit board 30 is coupled to the toroidal lens 10a which is in dashed line. The central convex member 32 is for mechanical coupling purpose. The toroidal lens 10a is further illustrated in FIG. 5.

Now referring to FIG. 5, which is a schematic front sectional view illustrating the controller circuit board 30 coupled to the toroidal lens 10a. The central convex member 32 is for mechanical coupling purpose. To assembly the light engine, the central convex member 32 is inserted into the central hole of the toroidal lens 10a. The toroidal lens in FIG. 5 includes an extended edge 33 which is for modular coupling purpose. Preferably, the tiny space between the LEDs 11 and the bottom of the toroidal lens 10a is filled with the optical impedance matching materials such as optical coupling gel. The reflection loss between LED and air, and between air and lens are eliminated. Unwanted reflections can be reduced more by the use of an anti-reflection optical coating on lens surface 14.

Figure 6:
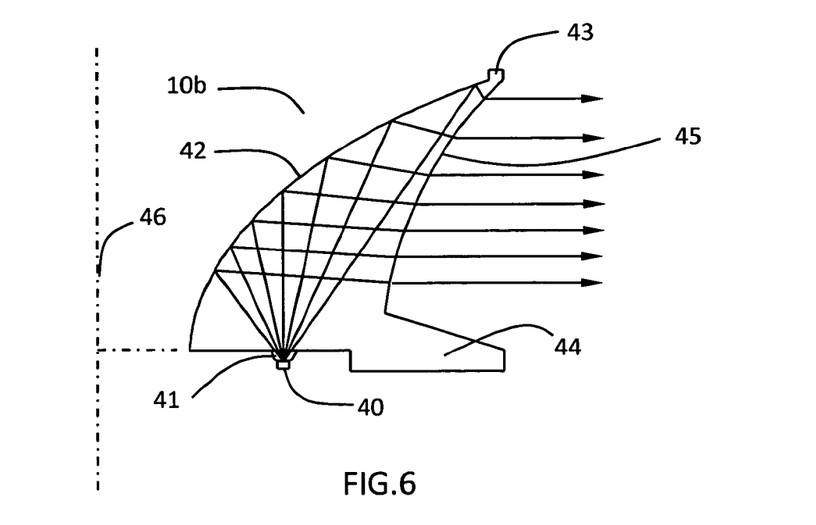
FIG. 6 is a half cross sectional view of another toroidal lens with a different curvature on the inner reflective surface according to the present invention.

FIG. 6 is a schematic cross-sectional view of another configuration of the toroidal lens according to this invention. The shape of the toroidal lens is made by revolving an irregular two-dimensional closed curve 10b around an axis 46 outside of the closed curve. The toroidal lens has a first extended edge 44 and a second extended edge 43, both of which are for mechanical and modular coupling purpose. In this configuration, the specific light path is as follows: the light beams from the LED 40 pass through the optical impedance matching gel 41 between the LED 40 and the bottom of the toroidal lens, reflected off the reflective surface 42, then projected through the refractive surface 45, to form even illumination with 360 degrees horizontally, and several degrees vertically. The vertical scattering angle and light intensity center angle is determined by the curvature co-efficient of the reflective surface 42 and the refractive surface 45.

Figure 7:
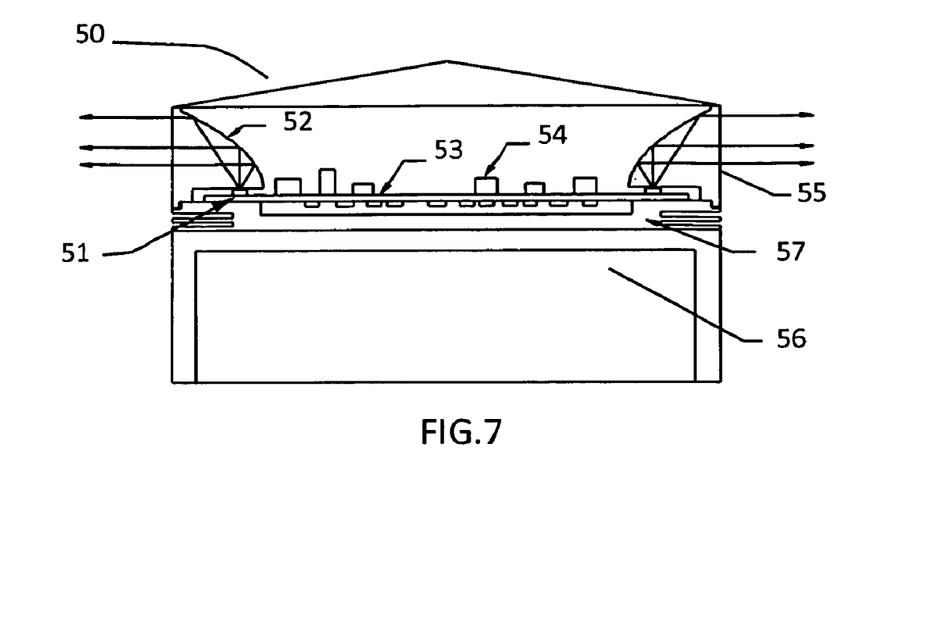
FIG. 7 is a schematic front sectional view of another single tier omni-directional light according to the first preferred embodiment of the invention.

FIG. 7 is a schematic front sectional view of a single tier configuration of the omni-directional light 50 according to the invention. The entire unit is may be enclosed with a transparent cover 55, to prevent damages from water, rain and insects. The properties of the toroidal reflective-refractive lens 52 are determined according to the designing requirements. In order to satisfy specific navigation and marking requirements, the positions of LEDs 51 mounted on the controller circuit board 53 can be adjustable to tune the vertical scattering angle and light intensity angle of the output light beam. All LEDs 51 are evenly spaced and mounted on the same circumference in the controller circuit board 53. The intensity of output light beam is controlled by changing the driving electrical current or the number of LEDs 51. All electronic circuit components 54 and the LEDs 51 can be mounted on the same controller board 53, using automated soldiering machines. The toroidal reflective-refractive lens 52 is mechanically coupled to the controller circuit board 53. The controller circuit board 53 is electronically coupled to the power source 56 which comprises of AC-DC rectifier, charging circuit and the battery. Both AC and DC power source can be used. For high power light engine, there is a heat sink 57 under the controller circuit board 30. The heat sink 57 is thermally connected with the controller circuit board 53. This configuration has the advantages of compact structure, minimal number of components, easy assembly, and wider range of operating environment.

In another preferred embodiment of this invention, the omni-directional light engine can be configured in a multi-tier framework. The multi-tier omni-directional light includes at least two modular units coupled together vertically.

Figure 8:
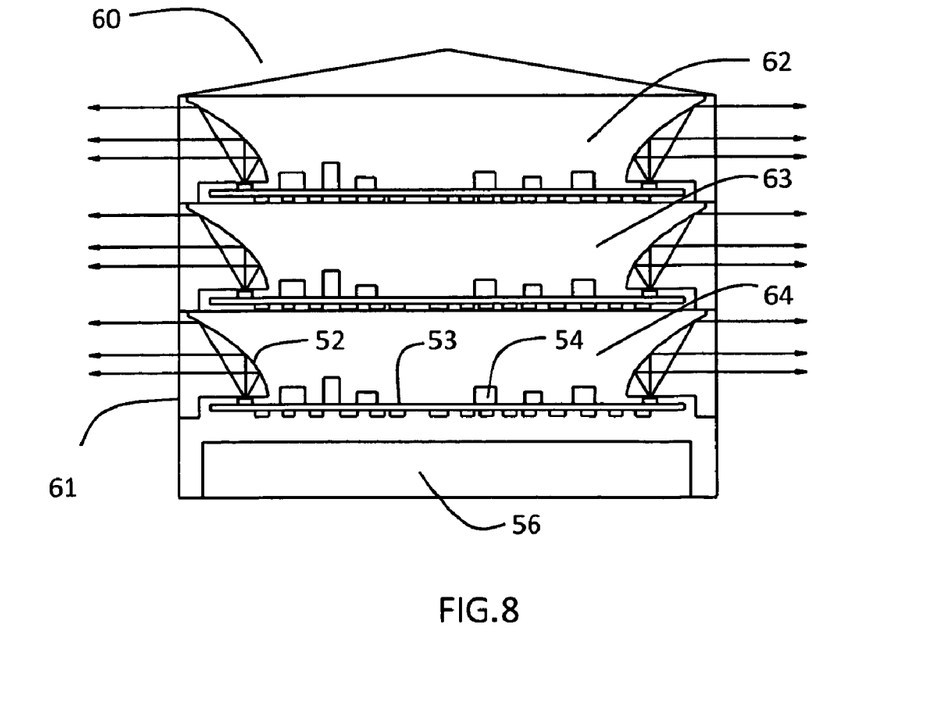
FIG. 8 is a schematic front sectional view of a multi tier omni-directional light according to the second preferred embodiment of the invention.

FIG. 8 is a schematic front sectional view of a multi-tier configuration of the omni-directional light 60 based on the single-tier light as illustrated in FIG. 7. The multi-tier light 60 includes at least two modular single-tier units, such as 62-64, which are stacked vertically. The units are vertically coupled together and are sealed in a transparent protection cover 61. The output light intensity is scalable. The specific number of tiers is adjustable according to requirements.

Figure 9:
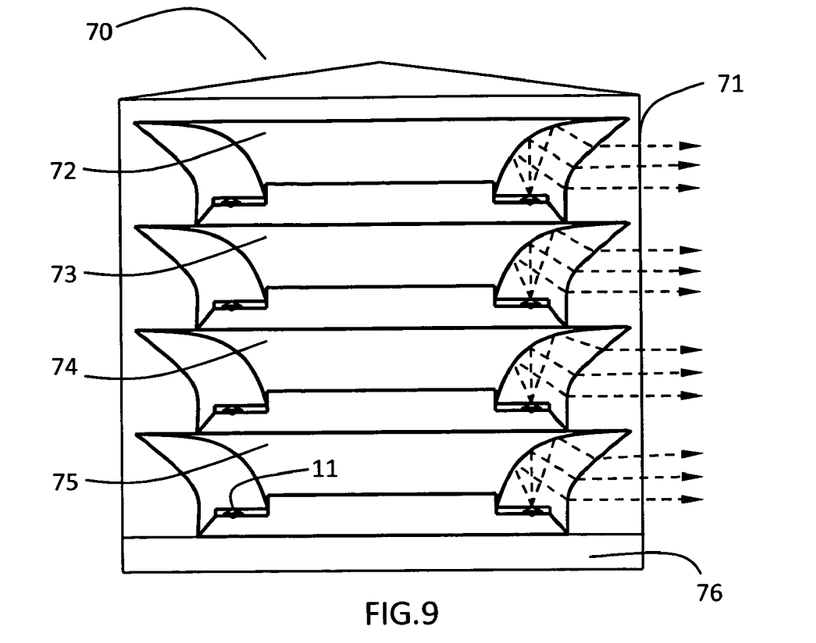
FIG. 9 is a schematic front sectional view of another multi tier omni-directional light according to the second preferred embodiment of the invention.

FIG. 9 is a schematic front sectional view of another multi-tier configuration of the omni-directional light 70 based on the single-tier light as illustrated in FIG. 5. The layout of each unit is substantially identical. The units, such as 72-75, are vertically coupled together and may be in a transparent protection cover 71. They share a same power source 76.

The LEDs in different units can be in different colors following any preset pattern. For example, units 72-75 are in red, yellow, blue and white, or red, green, red, and green, etc. The LEDs in a same unit can also be in different colors following any preset pattern.

Figure 10A:
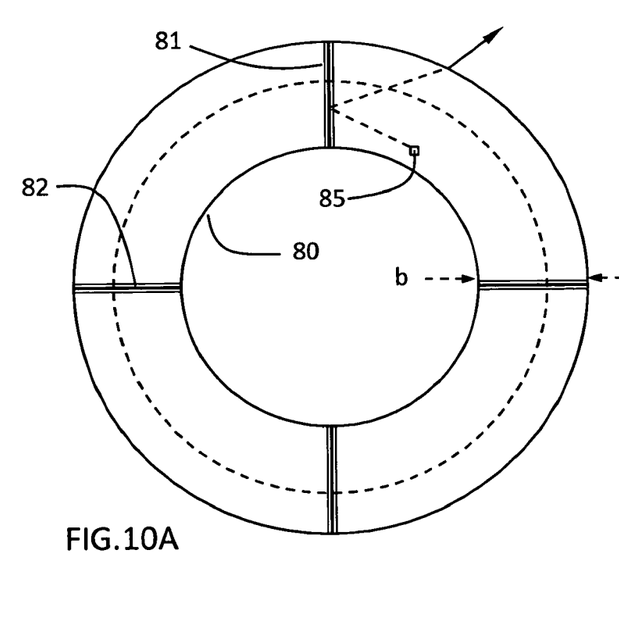
FIG. 10A is a schematic top view of a toroidal lens which is compartmentalized into four segments according to the third preferred embodiment of the invention.
Figure 10B:
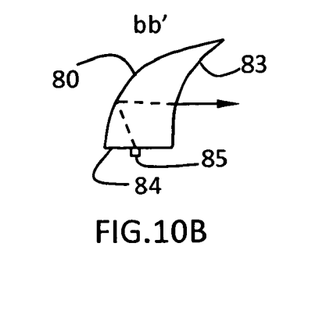
FIG. 10B is a cross sectional view of the toroidal lens of FIG. 10A.

In the further preferred embodiment of this invention, the toroidal lens in both the single tier and the multi-tier configurations described above can be compartmentalized into two or more segments. There is at least one LED placed under each segments. The LEDs in different segments can be in different color. Each segment can be mechanically modular, which means that it can be replaceable and can be used separately. FIG. 10A is a schematic top view of a toroidal lens which is compartmentalized into four equal segments. FIG. 10B is a cross sectional view of the toroidal lens. Each segment has two cross-sectional sides 81-82 which are planar surfaces coated with reflection materials. The light beams from the LEDs 85 under the bottom surface 84 are reflected at the inner reflective surface 80 and at the two cross-sectional sides 81-82, and then projected outwardly from the refractive surface 83. The modular compartmentalized configuration is especially useful in the circumstances, for example, the two-segment embodiment can be used in airports as a bidirectional light engine, where the light shows different colors to different directions.

While one or more embodiments of the present invention have been illustrated above, the skilled artisan will appreciate that modifications and adoptions to those embodiments may be made without departing from the scope and spirit of the present invention.

The invention claimed is:

1. An LED based omni-directional light engine, comprising:
   a toroidal lens coupled to a controller circuit board, said toroidal lens having a flat base surface, an outer surface, and an inner surface coated with a layer of reflection materials;
   at least two LEDs mounted to said controller circuit board;
   wherein said inner surface's upper edge is merged with said outer surface and said inner surface's lower edge is merged with said flat base surface, and a hollow space is substantially defined by said inner surface;
   wherein said controller circuit board is electrically coupled to a power source;
   wherein a distance between any two adjacent ones of said LEDs is substantially same;
   wherein said LEDs are located immediately under said flat base surface; and
   wherein said inner surface substantially reflects light beams emitted from said LEDs to said outer surface which refracts said beams to omni-directions.

2. The light engine of claim 1, wherein said inner surface or said outer surface is any of:
   a surface formed by revolving a segment of spherical profile;
   a surface formed by revolving a segment of parabola;
   a surface formed by revolving a segment of oval; and
   a surface formed by revolving a segment of aspherical profile; and
   wherein said inner surface and said outer surface have different curvatures.

3. The light engine of claim 2, wherein said revolving is made along an enclosed polygon path.

4. The light engine of claim 1, wherein a space between said flat base surface and each of said LEDs is filled with optical impedance matching gel.

5. The light engine of claim 1, further comprising at least one sensor mounted to said controller circuit board, said sensor being any of:
   thermo sensor;
   light sensor; and
   voltage sensor.

6. The light engine of claim 1, wherein said controller circuit board comprises at least one heat sink.

7. The light engine of claim 1, wherein each of said LEDs' position relative to said toroidal lens is adjustable.

8. The light engine of claim 1, wherein said LEDs are in different colors following any pattern.

9. An LED based omni-directional light engine, comprising:
   a toroidal lens coupled to a controller circuit board, said toroidal lens having a flat base surface, an outer surface, and an inner surface coated with a layer of reflection materials;
   at least two LEDs mounted to said controller circuit board;
   wherein said controller circuit board is electrically coupled to a power source;
   wherein a distance between any two adjacent ones of said LEDs is substantially same;
   wherein said LEDs are located immediately under said flat base surface;
   wherein said inner surface substantially reflects light beams emitted from said LEDs to said outer surface; and
   wherein said toroidal lens is compartmentalized into two or more segments, each of which having two cross sectional sides which are coated with reflection materials.

10. The light engine of claim 9, wherein each of said segments is mechanically modular.

11. An LED based omni-directional light engine, comprising at least two modular light source units which are vertically coupled together and are sealed in a transparent cover, wherein each of said light source units comprises:
    a toroidal lens coupled to a controller circuit board, said toroidal lens having a flat base surface, an outer surface, and an inner surface coated with a layer of reflection materials;
    at least two LEDs mounted to said controller circuit board;
    wherein said inner surface's upper edge is merged with said outer surface and said inner surface's lower edge is merged with said flat base surface, and a hollow space is substantially defined by said inner surface;
    wherein said controller circuit board is electrically coupled to a power source;
    wherein a distance between any two adjacent ones of said LEDs is substantially same;
    wherein said LEDs are located immediately under said flat base surface; and
    wherein said inner surface substantially reflects light beams emitted from said LEDs to said outer surface which refracts said beams to omni-directions.

12. The light engine of claim 11, wherein said inner surface or said outer surface is any of:
    a surface formed by revolving a segment of spherical profile;
    a surface formed by revolving a segment of parabola;
    a surface formed by revolving a segment of oval; and
    a surface formed by revolving a segment of aspherical profile; and
    wherein said inner surface and said outer surface have different curvatures.

13. The light engine of claim 12, wherein said revolving is made along an enclosed polygon path.

14. The light engine of claim 11, wherein a space between said flat base surface and each of said LEDs is filled with optical impedance matching gel.

15. The light engine of claim 11, further comprising at least one sensor mounted to said controller circuit board, said sensor being any of:

thermo sensor;

light sensor; and voltage sensor.

16. The light engine of claim 11, wherein said controller circuit board comprises at least one heat sink.

17. The light engine of claim 11, wherein each of said LEDs' position relative to said toroidal lens is adjustable.

18. The light engine of claim 11, wherein said LEDs are in different colors following any pattern.

19. An LED based omni-directional light engine, comprising at least two modular light source units which are vertically coupled together and are sealed in a transparent cover, wherein each of said light source units comprises:

a toroidal lens coupled to a controller circuit board, said toroidal lens having a flat base surface, an outer surface, and an inner surface coated with a layer of reflection materials;

at least two LEDs mounted to said controller circuit board;

wherein said controller circuit board is electrically coupled to a power source;

wherein a distance between any two adjacent ones of said LEDs is substantially same;

wherein said LEDs are located immediately under said flat base surface;

wherein said inner surface substantially reflects light beams emitted from said LEDs to said outer surface; and wherein said toroidal lens is compartmentalized into two or more segments, each of which having two cross sectional sides which are coated with reflection materials.

20. The light engine of claim 19, wherein each of said segments is mechanically modular.

* * * * *